Dec. 3, 1963        O. L. UTT        3,113,274
ANALOG SQUARING DEVICE
Filed June 22, 1960

INVENTOR.
Orval L. Utt.
BY W. L. Stout.

HIS ATTORNEY

United States Patent Office 3,113,274
Patented Dec. 3, 1963

3,113,274
ANALOG SQUARING DEVICE
Orval L. Utt, Monroeville, Pa., assignor to Westinghouse Air Brake Company, Wilmerding, Pa., a corporation of Pennsylvania
Filed June 22, 1960, Ser. No. 38,024
5 Claims. (Cl. 328—144)

This application relates to analog computers, and in particular to an improved analog squaring device for producing a voltage proportional to the square of an applied voltage.

In many applications of computing and control apparatus, it is necessary to derive a voltage which is proportional to the square of an applied voltage. For this purpose, a number of expedients have been devised. However, so far as I am aware, most of these expedients are either limited in range because they rely on approximations, or they require complicated or expensive apparatus which is difficult to keep in adjustment. Accordingly, it is an object of my present invention to provide an improved analog squaring device which produces a true mathematical square of an applied voltage, and which employs relatively simple apparatus that is stable and requires little adjustment.

In carrying out my invention, I provide a source of voltage of triangular wave form, commonly called a sawtooth generator, which has a relatively constant amplitude. Such sources are readily available, as is well known in the art. I further provide a clamping circuit controlled by the voltage to be squared to clamp the output of the sawtooth generator to a value corresponding to the applied voltage. At the output of the clamping circuit, I provide rectifying means for selecting the biased portion of the clamped voltage, and an averaging circuit for producing an output voltage in accordance with the average voltage of the selected portion. The detailed arrangement of circuits for carrying out my invention will be described more fully hereinafter.

I shall first describe one embodiment of my invention in detail, and shall then point out the novel features thereof in claims.

Figure 1:
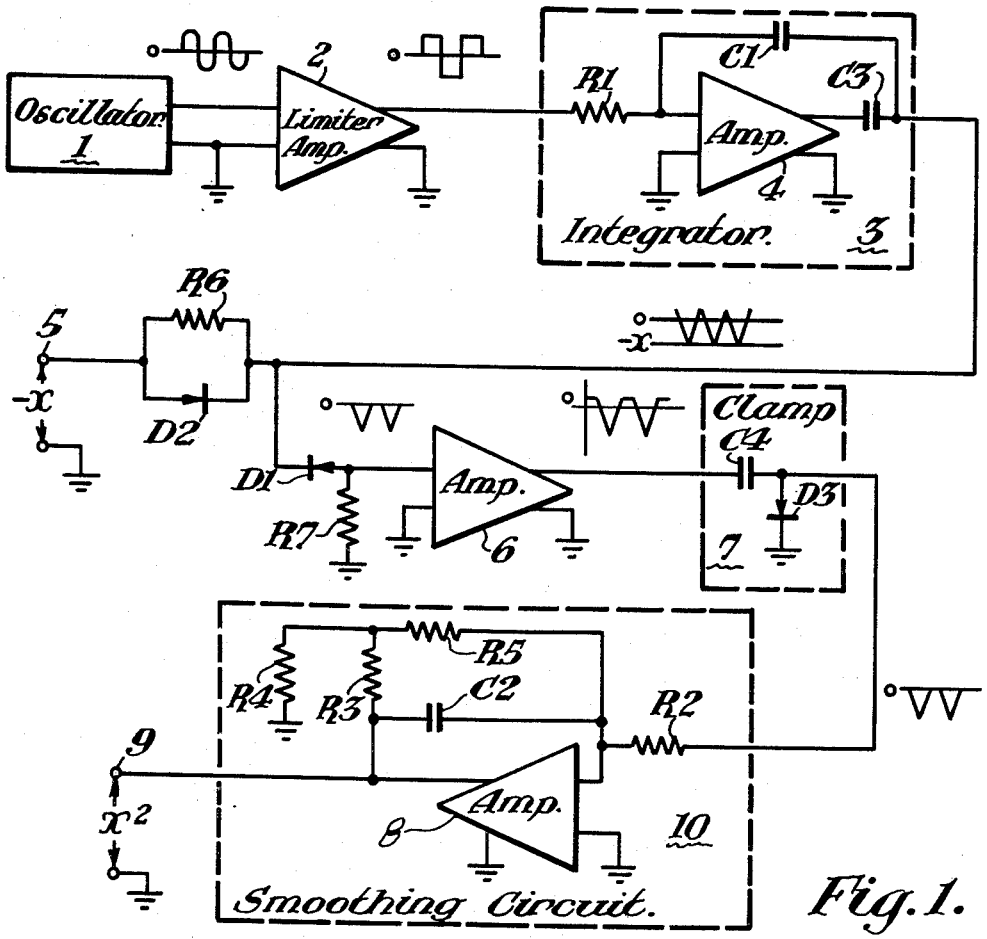
Figure 2:
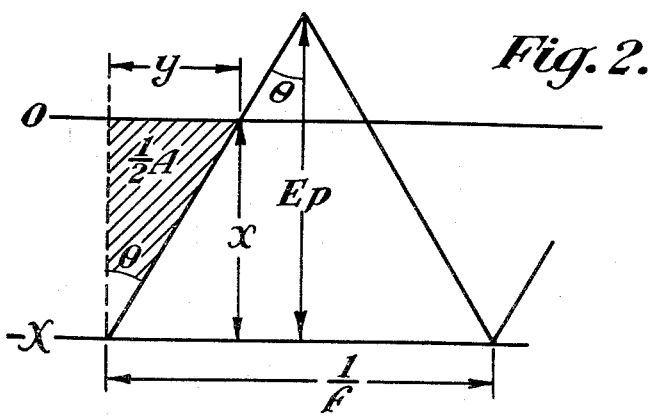

The detailed embodiment of my invention to be described will best be understood by reference to the accompanying drawings, in which, FIG. 1 is a schematic wiring diagram of a preferred form of my invention, and FIG. 2 is a graph showing certain relationships between the elements of a wave form appearing in the apparatus in FIG. 1, whereby the square of an applied voltage is derived.

Referring now to FIG. 1, an oscillator 1 is shown which may be of any conventional form, but which should have a relatively constant output amplitude for reasons which will appear. The frequency of the oscillator is not critical, except that it should be relatively high with respect to pertinent time constants of external apparatus with which my invention is to be employed; in particular, if the square of the applied voltage is to properly follow it, the frequency of the oscillator should be high compared with the ripple frequency of the applied voltage. For example, in one practical embodiment of my invention, adapted to square a voltage proportional to the speed of a railway car moving at speeds ranging from 0 to 30 m.p.h., I have employed a frequency of 784.7 cycles per second.

Connected to the output of oscillator 1 is a limiter-amplifier 2 which may be of any conventional construction suited to the purpose of converting the output of oscillator 1 to a square wave of constant amplitude and a frequency equal to the oscillator frequency. Since such amplifiers are well known in the art, it is believed unnecessary to described this component in further detail.

Connected to the output of amplifier 2 is a conventional integrator 3. This unit functions in a known manner to produce a sawtooth voltage by integrating the applied square wave. While this unit may be of any suitable construction, it is here shown to comprise an input resistance R1, an amplifier 4, a feedback capacitor C1 connected around the amplifier, and an output coupling capacitor C3. As shown, the output terminal of capacitor C1 is connected to the output side of coupling capacitor C3; however, it has been found that it makes little difference on which side of capacitor C3 this connection is made. There is a slight theoretical advantage in making the connection as shown, since with this connection the output is tied somewhat more faithfully to the input.

It will be appreciated by those skilled in the art as the description proceeds that the above described combination of oscillator 1, limiter-amplifier 2, and integrator 3 could, in the broader aspects of my invention, be replaced by any other suitable circuit for producing a substantially linear triangular wave form of substantially constant amplitude.

Connected across the output of integrator 3 is a series combination comprising a diode D1 and a resistor R7. As shown, diode D1 is oriented to block positive swings of the output of the integrator above ground, but to permit the flow of current when the output goes below ground.

Connected between diode D1 and an input terminal 5 is a parallel combination comprising a resistor R6 connected across a diode D2, which, as shown, is oriented opposite to the orientation of diode D1. As shown, a variable voltage $x$, to be squared, is adapted to be applied between terminal 5 and ground. The voltage $x$ is required, with the other polarities shown, to be negative with respect to ground, to be unidirectional in character, and to have a maximum amplitude which is less than the amplitude of the output of integrator 3. In practice, of course, the maximum amplitude of the applied voltage would presumably be given, and the components for generating the sawtooth voltage would be proportioned to give an amplitude in excess of the maximum amplitude of $x$.

As indicated in FIG. 1, the voltage at the junction of diodes D1 and D2 comprises the sawtooth output of integrator 3 biased below reference (ground) by an amount proportional to $x$. The average value of the voltage between ground and $-x$ is proportional to $x^2$, as will appear.

Since diode D1 is oriented to block current flow due to positive voltages at the junction of diodes D1 and D2, only that portion of the voltage at this junction which is below ground will appear across resistor R7, as indicated in FIG. 1. The remaining circuitry, to be described, serves to develop a unidirectional voltage having an amplitude proportional to the average value of the voltage across resistor R7, and hence proportional to $x^2$.

The values of components R6 and R7 can readily be selected to satisfy the requirements of any specific installation. However, as one example, in the practical embodiment of my invention mentioned above, resistors R6 and R7 were both 1 megohm. Resistor R6 is chosen such that the parallel combination of R6 and diode D2 has a high impedance in the reverse direction of the diode, compared with the low impedance through the diode in the forward direction. Thus, the junction of diodes D1 and D2 is prevented from going below the potential of input terminal 5, but readily follows potential swings above this potential due to the relatively large time constant of resistor R6 in combination with capacitors C3 and C1.

Connected across resistor R7 is a conventional amplifier 6, which in the preferred form of my invention is a cathode follower having an output in phase with the input, although any other type of amplifier could obviously be employed if so desired. Connected to the output of amplifier 6 is a clamp 7, which functions to remove the bias introduced by cathode-follower 6. It should be understood that if a multiple stage operational amplifier, such as used in analog computing circuits, rather than a simple cathode-follower, were employed, clamp 7 would not be needed.

At the output of clamp 7 is connected a smoothing circuit 10, which serves to invert, amplify and filter the signal from clamp 7. This circuit comprises an input resistor R2, an amplifier 8, and a feedback network including resistors R3, R4 and R5 and a capacitor C2. Capacitor C2 provides a low impedance degenerative feedback path for alternating components of the output, and resistors R3, R4 and R5 provide a relatively higher impedance feedback path for all frequencies, including zero frequency (or D.C.). The proportion of resistive feedback to reactive feedback is set by the choice of the components to give a desired smoothing characteristic, such that the output will be a unidirectional voltage varying at the frequency of variations in the input on terminal 5, but free of spurious ripple at higher frequencies. The zero frequency gain of amplifier 8 is controlled by the combination of resistors R2, R3, R4, and R5. These are chosen so as to provide proper calibration. That is, with a given signal at the input signal terminal 5, the output voltage resulting from that signal can be set at any desired level by proper choice of the resistors.

For example, in the practical embodiment of my invention previously referred to, the following component values were employed:

R2 = 2 megohms
R3 = 1 megohm
R4 = 1 megohm
R5 = 2 megohms
C2 = .05 microfarad

In order to illustrate the operation of this embodiment of my invention, let it be assumed that oscillator 1, limiter-amplifier 2 and integrator 3 are in operation to produce a sawtooth output of any convenient frequency and amplitude. It will also be assumed that a voltage $-x$ is applied between input terminal 5 and ground which has a magnitude smaller than the amplitude of the sawtooth voltage. Considering now the junction between diodes D1 and D2, the voltage at this junction cannot swing below $-x$, since when it tends to do so diode D2 will act as a short circuit. On the other hand, capacitors C1 and C3 must be charged through the relatively large series resistor R6 when the potential swings above $-x$. The time constant of these charging circuits is selected to be large compared to the reciprocal of the frequency of the sawtooth, so that the potential of the junction between diodes D1 and D2 follows excursions above $-x$ linearly. The result is that a wave form of the type shown is produced, with the sawtooth being biased below reference ground by a value $-x$.

Referring now to FIG. 2, the area A per cycle of the portion of the sawtooth voltage below reference ground is seen to be twice the shaded area. The angle between the rising wave form and the vertical is $\theta$. The maximum amplitude of the sawtooth is assumed to be $E_p$, and the sawtooth is assumed to have a frequency $f$. From the relations shown in FIG. 2, by similar triangles is readily seen that $$fE_p = \frac{x}{2y}$$

Solving this equation for $y$, $$y = \frac{x}{2fE_p}$$

Since $A = xy$, by substitution, $$A = \frac{x^2}{2fE_p}$$

The average voltage between reference ground and $-x$ is $$A \div \frac{1}{f}, \text{ or } Af$$

Substituting the value of A from above, this average value becomes $$Af = \frac{x^2}{2E_p}$$

Thus, if the amplitude $E_p$ is relatively constant, it is apparent that the average value of the voltage between reference ground and $-x$ will be proportional to the square of $x$. It will be noted that this average is not sensitive to changes in frequency.

Turning now to FIG. 1, the portion of the signal between reference ground and $-x$ appears across resistor R7, where it is amplified by amplifier 6 and coupled to the smoothing circuit 10 through clamp 7. Any positive excursions are prevented by the clamping action of diode D3 in clamp 7. The unidirectional voltage appearing across diode D3 is applied to the filter network comprising resistors R2, R3, R4 and R5, amplifier 8 and capacitor C2. As a result, the high frequency components of the signal are in effect smoothed out by the integrating action of amplifier 8 and condenser C2, and the output at terminal 9 is a unidirectional voltage proportional to $x^2$, as shown.

While I have shown only one embodiment of my invention in detail, many possible changes and modifications will be apparent to those skilled in the art after reading this description. Accordingly, I do not wish to be limited to the details shown, but only by the scope of the following claims.

Having thus described my invention, what I claim is:

1. In combination, a first diode and a first resistor connected to form a series combination, a second diode and a second resistor connected to form a parallel combination, a connection between the diode end of said series combination and one end of said parallel combination to form a resultant combination in which said diodes are in opposition, means for applying a voltage of sawtooth waveform and having a substantially constant amplitude across said series combination, means for applying a unidirectional voltage to be squared across said resultant combination in a sense opposing flow through said second diode, and means responsive to the average voltage across said first resistor for producing an output voltage having an amplitude proportional to the square of said applied unidirectional voltage.

2. In combination, an oscillator, a limiting amplifier connected to said oscillator and producing an output voltage of square waveform at the frequency of said oscillator, an integrator connected to said limiting amplifier and producing an output of triangular waveform, a first diode and a first resistor connected in series across the output of said integrator, a second diode and a second resistor connected in parallel and connected in series with a variable source of voltage across the output of said integrator, said first and second diodes being connected in series opposition and said second diode being connected to oppose the flow of current from said variable source, an amplifier connected across said first resistor and producing an output having an average value in accordance with the square of said variable voltage, and low-pass filter means connected to said amplifier to produce an output voltage having an amplitude in accordance with the square of said variable voltage.

3. In combination, a first diode and an impedance connected to form a series combination, a second diode and a resistance connected to form a parallel combination, the diode end of said series combination being connected to one end of said parallel combination with said diodes in opposition to form a series-parallel combination, means for applying a sawtooth voltage of reference amplitude across said series combination, means for applying a unidirectional variable voltage across said series-parallel combination in a sense opposed by said second diode, and means controlled by the average value of the voltage across said impedance for producing an output voltage proportional to the square of said variable voltage.

4. In combination, sawtooth generating means for producing a voltage of constant amplitude, a first diode and an impedance connected in series across the output of said generating means, a second diode and a resistor connected in parallel and connected in series with a source of variable unidirectional voltage across the output of said generating means, said first and second diodes being connected in series opposition and said second diode being connected to oppose the flow of current from said variable voltage source, and means connected across said impedance and responsive to the voltage thereacross for producing an output voltage in accordance with the average value thereof.

5. In combination, a voltage source providing an output having sawtooth waveform, a first diode and a first resistor connected in series across said sawtooth source, a second diode and a second resistor connected in parallel, said parallel network being connected in series with a variable unidirectional voltage source, said second diode being poled to oppose the flow of current from said unidirectional voltage source, the series-parallel circuit being connected across said sawtooth source to clamp the sawtooth voltage wave to the existing reference level of said unidirectional voltage source, said first and said second diodes being oppositely poled at their common connection to said sawtooth source, said first diode being poled to pass the clamped sawtooth wave form voltage into said first resistor only as a series of voltage pulses of selected polarity and of triangular wave form, said selected polarity corresponding to that of said unidirectional voltage, and averaging means connected across said first resistor and responsive to said triangular voltage pulses for producing an output voltage proportional to the square of said unidirectional voltage.

References Cited in the file of this patent

UNITED STATES PATENTS

| | | |
|---|---|---|
| 2,438,927 | Labin | Apr. 6, 1948 |
| 2,682,035 | Schwittek | June 22, 1954 |
| 2,900,137 | Giser | Aug. 18, 1959 |

FOREIGN PATENTS

| | | |
|---|---|---|
| 162,722 | Australia | Aug. 20, 1953 |

OTHER REFERENCES

Lion and Davis: "Square Law Circuit," Electronics, September 1955, pages 192, 194, 196, 198, 200, 202; (page 194 relied on).